United States Patent
Poslinski

(10) Patent No.: US 7,725,827 B2
(45) Date of Patent: May 25, 2010

(54) METHOD AND SYSTEM FOR DISPLAYING ONE OR MORE RECORDED MEDIA CONTENT INSTANCES

(75) Inventor: Thomas Poslinski, Elma, NY (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1672 days.

(21) Appl. No.: 10/926,825

(22) Filed: Aug. 26, 2004

(65) Prior Publication Data

US 2006/0045472 A1 Mar. 2, 2006

(51) Int. Cl.
*G06F 3/00* (2006.01)
*H04N 5/91* (2006.01)

(52) U.S. Cl. .................. 715/721; 715/716; 715/719; 715/720; 725/37; 725/39; 725/59; 386/46

(58) Field of Classification Search .......... 715/716, 715/719, 720, 721; 725/37, 39, 59; 386/46
See application file for complete search history.

(56) References Cited

U.S. PATENT DOCUMENTS

| 6,091,886 | A | 7/2000 | Abecassis |
| RE37,000 | E | 12/2000 | Shinyagaito et al. |
| 6,177,931 | B1 | 1/2001 | Alexander et al. |
| 6,259,443 | B1 | 7/2001 | Williams, Jr. |
| 6,353,444 | B1 * | 3/2002 | Katta et al. .............. 715/716 |
| 6,407,779 | B1 | 6/2002 | Herz |
| 6,564,005 | B1 | 5/2003 | Berstis |
| 6,642,939 | B1 * | 11/2003 | Vallone et al. ........... 715/721 |
| 6,748,596 | B2 | 6/2004 | Knudson et al. |
| 6,757,906 | B1 * | 6/2004 | Look et al. ................. 725/45 |
| 7,159,232 | B1 * | 1/2007 | Blackketter et al. ....... 725/38 |
| 7,394,967 | B1 * | 7/2008 | Potrebic et al. ........... 386/46 |
| 2002/0044225 | A1 | 4/2002 | Rakib |
| 2002/0057893 | A1 * | 5/2002 | Wood et al. ................ 386/46 |
| 2002/0174430 | A1 * | 11/2002 | Ellis et al. ................. 725/46 |
| 2003/0005429 | A1 * | 1/2003 | Colsey ...................... 725/8 |
| 2003/0108328 | A1 * | 6/2003 | Kawasaki et al. ......... 386/46 |
| 2003/0202776 | A1 * | 10/2003 | Kendall et al. ............ 386/94 |
| 2003/0206719 | A1 * | 11/2003 | Bumgardner et al. ..... 386/83 |
| 2005/0028199 | A1 * | 2/2005 | Borden ..................... 725/40 |
| 2005/0086692 | A1 * | 4/2005 | Dudkiewicz et al. ...... 725/46 |
| 2005/0240963 | A1 * | 10/2005 | Preisman et al. .......... 725/44 |
| 2006/0037043 | A1 * | 2/2006 | Kortum et al. ............ 725/37 |

* cited by examiner

*Primary Examiner*—Steven P Sax
*Assistant Examiner*—Grant D Johnson
(74) *Attorney, Agent, or Firm*—Rader, Fishman & Grauer PLLC

(57) ABSTRACT

A method and system for displaying one or more recorded media content instances. After a first recorded media content instance is displayed, one or more graphical user interfaces (GUIs) configured to allow a user to choose to delete or retain the first media content instance and transition to a second recorded media content instance may be displayed.

14 Claims, 8 Drawing Sheets

RECORDED PROGRAM LIST — 135

| Title | Length | Date Recorded |
|---|---|---|
| Seinfeld | 30 min | 7/1/04 |
| Sportscenter | 60 min | 6/28/04 |
| The Simpsons | 30 min | 6/27/04 |
| Seinfeld | 30 min | 6/24/04 |
| Wimbledon | 120 min | 6/23/04 |
| Sienfeld | 30 min | 6/17/04 |

METHOD AND SYSTEM FOR DISPLAYING ONE OR MORE RECORDED MEDIA CONTENT INSTANCES

BACKGROUND

The advent of computers, interactive electronic communication, the Internet, and other advances in the digital realm of consumer electronics have resulted in a great variety of programming, recording, and viewing options for users who view media content such as television programs. In implementing such enhanced programming, the set-top box (STB) has become an important computing device for accessing media content services and the media content within those services. In addition to supporting traditional analog broadcast video functionality, STBs may also support an increasing number of two-way digital services such as video-on-demand and personal video recording.

An STB is typically connected to a cable or satellite, or generally, a subscriber television system, and includes hardware and software necessary to provide the functionality of the subscriber television system at the user's site. The STB typically includes a processor, communication components, and memory and is connected to a television or other display device, such as a personal computer. While many STBs are stand-alone devices that are externally connected to a television, an STB and/or its functionality may be integrated into a television or personal computer or even an audio device such as a programmable radio, as will be appreciated by those of ordinary skill in the art.

STBs are typically capable of providing users with a very large number and variety of media content choices. As the number of available media content choices increases, viewing conflicts arise whereby the user must choose between watching two or more media content instances (e.g. discrete, individual instances of media content such as, for a non-limiting example, a particular television show or "program"), all of which the user may like to view. Further, because of the large number of viewing choices, the user may miss viewing opportunities. Buffering of media content instances in memory or other storage device (e.g. hard disk drive) coupled to the STB has provided some relief from the conflict in viewing choices while providing personal video recording functionality. However, current buffering mechanisms for personal video recording are confusing to the user.

As mentioned, an STB may include a personal video recording (PVR) application that provides for media content recording functionality by enabling the temporary writing to, and if requested, more permanent recording to a storage device. A PVR application is also known as a Digital Video Recording (DVR) application. The PVR application may be integrated into the STB or it may be a stand-alone unit known as a personal video recorder. A typical PVR application allows the user to view the media content in trick play modes. Trick play modes allow the user to watch media content in a non-linear fashion by recording the media content in a temporary memory buffer, often called a live cache buffer, and then replaying the recorded media content in a manner other than a normal, sequential replay. Trick play modes include, but are not limited to, slow motion, fast motion, reverse play, fast forward play, instant replay, jumping, pausing of live broadcast, and scanning.

In a typical PVR application, a progress bar is a graphical tool that is used to illustrate how much media content has been recorded during a particular time window. The length of the progress bar may correspond to the amount of media content that has been recorded in a live cache buffer or in a permanent buffer. However, a number of difficulties arise in operating a STB having a PVR application. For example, it is often difficult for a user to transition between the display of multiple recorded media content instances.

SUMMARY

In one of many possible embodiments, the present invention provides a method and system for displaying one or more recorded media content instances. The method includes displaying a first recorded media content instance, terminating the display of the first recorded media content instance, displaying after the termination one or more graphical user interfaces (GUIs) configured to allow a user to choose to delete or retain the first media content instance and transition to a second recorded media content instance, and performing the deletion or retention of the first media content instance and displaying the second recorded media content instance.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

FIG. 3 illustrates an exemplary recorded program list graphical user interface (GUI) according to one exemplary embodiment of the present invention.

Throughout the drawings, identical reference numbers designate similar, but not necessarily identical, elements.

DETAILED DESCRIPTION

A method and system for displaying one or more recorded media content instances are described herein. The user may select a recorded media content instance to be displayed on the display device. Once the selected recorded media content instance is displayed, one or more graphical user interfaces (GUIs) configured to allow a user to choose to delete or retain the selected media content instance and transition to a previous or next recorded media content instance may be displayed. The STB either deletes or retains the selected media content instance as indicated by the user and then displays the previous or next recorded media content instance as indicated by the user.

In the following description, for purposes of explanation, numerous specific details are set forth in order to provide a thorough understanding of the present system and method. It will be apparent, however, to one skilled in the art that the present system and method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Figure 1:
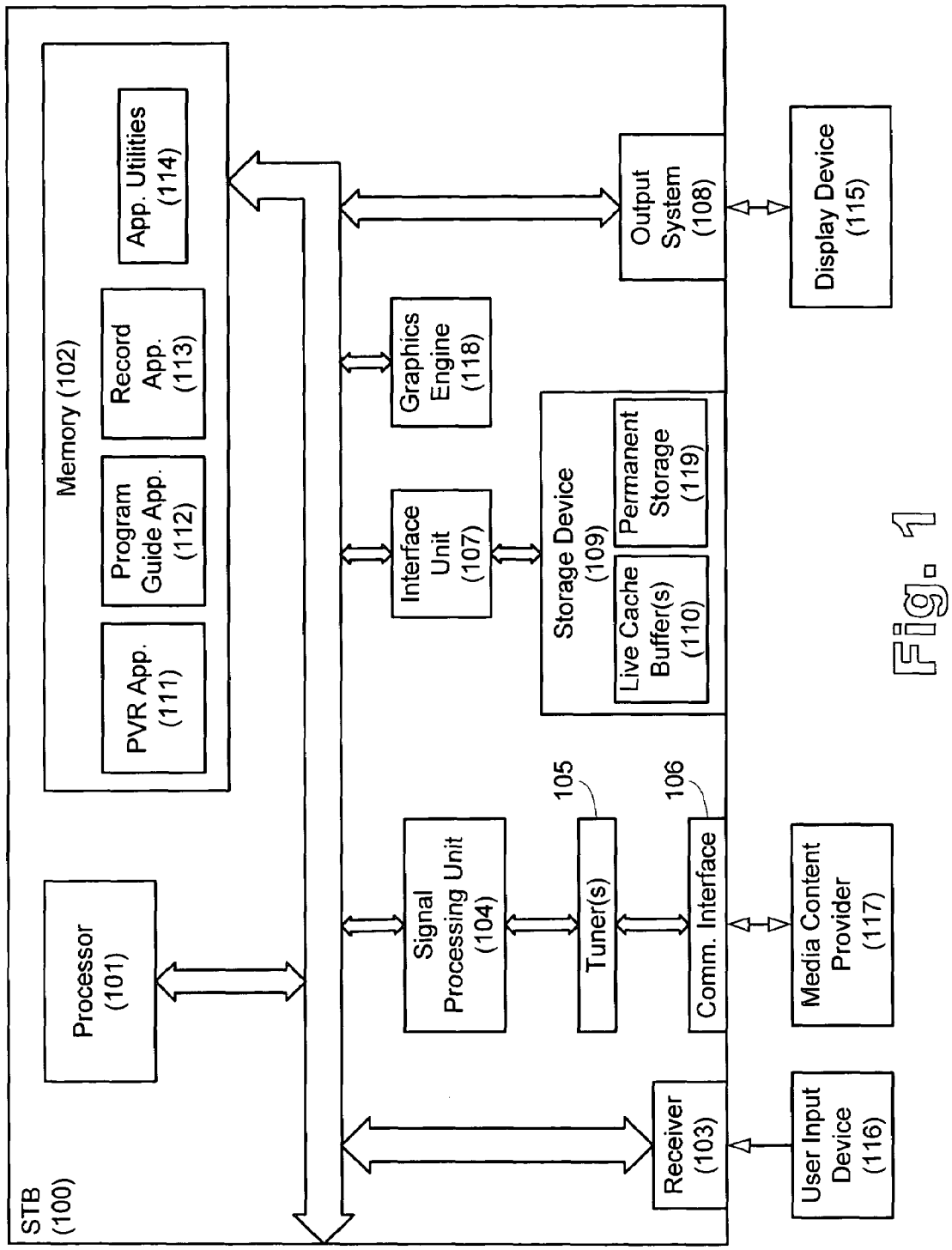
FIG. 1 is a block diagram of an exemplary set-top box (STB) according to one exemplary embodiment of the present invention.

FIG. 1 is a block diagram of an exemplary set-top box (STB) (100) according to an exemplary embodiment of the present invention. An STB (100) may also be referred to as a home communication terminal (HCT) or as a digital home communication terminal (DHCT). As used herein and in the appended claims, unless otherwise specifically denoted, the term "set-top box" will be used to refer expansively to all possible receivers that receive and decode digital and/or analog media content. It will be understood that the STB (100) shown in FIG. 1 is merely illustrative and should not be construed as implying any limitations upon the scope of the preferred embodiments of the invention.

As shown in FIG. 1, the STB (100) may include a communication interface (106) configured to receive media content from a media content provider (117). The media content provider (117) may provide various types of media content via a satellite or cable system (not shown). The media content may include, but is not limited to, television programs, pay-per-view services, video-on-demand programming, Internet services, and audio programming.

The STB (100) may also include a tuner system (105) configured to tune into a particular television channel or frequency to display media content and for sending and receiving various types of data or media content to and from the media content provider (117). According to an exemplary embodiment of the present invention, the tuner system (105) may include multiple tuners such that multiple channels of media content may be processed and/or shown on a display device (115). For example, the tuner system (105) may include a first tuner configured to receive an analog video signal corresponding to a first media content instance and a second tuner configured to simultaneously receive a digital compressed stream corresponding to a second media content instance. The tuner system (105) may have any number of tuners configured to receive any kind of media content according to one embodiment of the present invention.

The STB (100) may also include one or more processors, such as processor (101) configured to control operations of the STB (100), and an output device or system (108) configured to drive the display device (115). The display device (115) may be a television, computer monitor, or any other device configured to display or play the media content. The STB (100) may also include a signal processing unit (104) configured to process the media content. The signal processing unit (104) may include a demodulating and parsing system (not shown) for demodulating and parsing the media content. In one embodiment, the STB (100) may include multiple signal processing units (104) each corresponding to one of the tuners in the tuner system (105). The STB (100) may also include one or more compression and/or multiplexing units (not shown) for multiplexing various media content streams into a transport stream or the like.

One or more programmed applications (111-113) may be executed by a user of the STB (100) by utilizing the computing resources in the STB (100). The applications, or application clients, may be resident in memory (102). The memory (102) may be FLASH memory, DRAM memory, or a combination of FLASH and DRAM memory, for example. Applications (111-113) stored in memory (102) may be executed by the processor (101). Data generated by an application may be stored in the memory (102) or in a storage device (109) during the course of application execution. The memory (102) may also include application utilities (114) useful to the applications. The utilities (114) may include a timer manager, a configuration manager, a database manager, and other utilities depending on the particular applications included in the STB (100).

One of the applications may be a program guide application (112) configured to generate a program guide that is displayed on the display device (115). An exemplary program guide is a graphical user interface (GUI) that performs various functions including allowing a user to select and view program information associated with various media content. Another one of the applications may be a record application (113). The record application (113) may be configured to permanently and/or temporarily record media content in one or more buffers or storage units.

The STB (100) may also include a personal video recording (PVR) application (111). According to an exemplary embodiment, the PVR application (111) may be integrated into the STB (100), as shown in FIG. 1, or it may be a stand-alone unit. A stand-alone PVR may be coupled to an STB (100) or it may be used in place of an STB (100). As used herein and in the appended claims, the term "PVR application" will be used to refer to any application or device configured to record media content and/or allow the viewing of media content in trick play mode. Trick play modes include, but are not limited to, slow motion, fast motion, reverse play, fast forward play, instant replay, jumping, pausing of live broadcast, and scanning. In the examples contained herein, it will be assumed that the PVR application (111) is integrated into the STB (100) for illustrative purposes only. In one embodiment, the program guide application (112) and/or the record application (113) may be integrated into the PVR application (111).

The PVR application (111) provides for media content recording functionality by enabling the temporary writing to, and if requested, more permanent recording to a storage device (109). The storage device (109) may be a hard drive, optical disc, or other non-volatile storage unit. The storage device (109) of FIG. 1 is shown to be a part of the STB (100) for illustrative purposes only. It will be understood that the storage device (109) maybe an external storage device.

The STB (100) may also include a graphics engine (118) configured to generate graphics to be displayed on the display device (115). The graphics may include a program guide, a progress bar, and other applications.

In one exemplary embodiment, media content received at the tuner (105) is temporarily buffered, or stored, in a live cache buffer (110). If there are multiple tuners (105), there may be a live cache buffer (110) corresponding to each of the tuners (105). As shown in FIG. 1, the live cache buffer (110) may be a part of the storage device (109) (e.g. a reserved portion of a hard dive). In an alternative embodiment (not shown), the live cache buffer (110) may reside in memory (102) or in a storage device external to the STB (100). Media content received into the live cache buffer (110) has a temporary recording designation. In other words, the media content stored in the live cache buffer (110) will either be deleted or retained through election by the user as a permanent recording. A permanent recording will be understood to mean media content that is stored for an extended period of time as decided by the user. Permanent recordings may be stored in a permanent storage unit (119), for example. The permanent storage unit (119) may be a part of the storage device (109) or it may be a stand-alone unit. For example, the permanent storage unit (119) may be a hard drive, an optical disc, a network drive, a buffer in memory, or any other type of permanent storage device that is a part of the storage unit (109) or that is a stand-alone unit.

Figure 2:
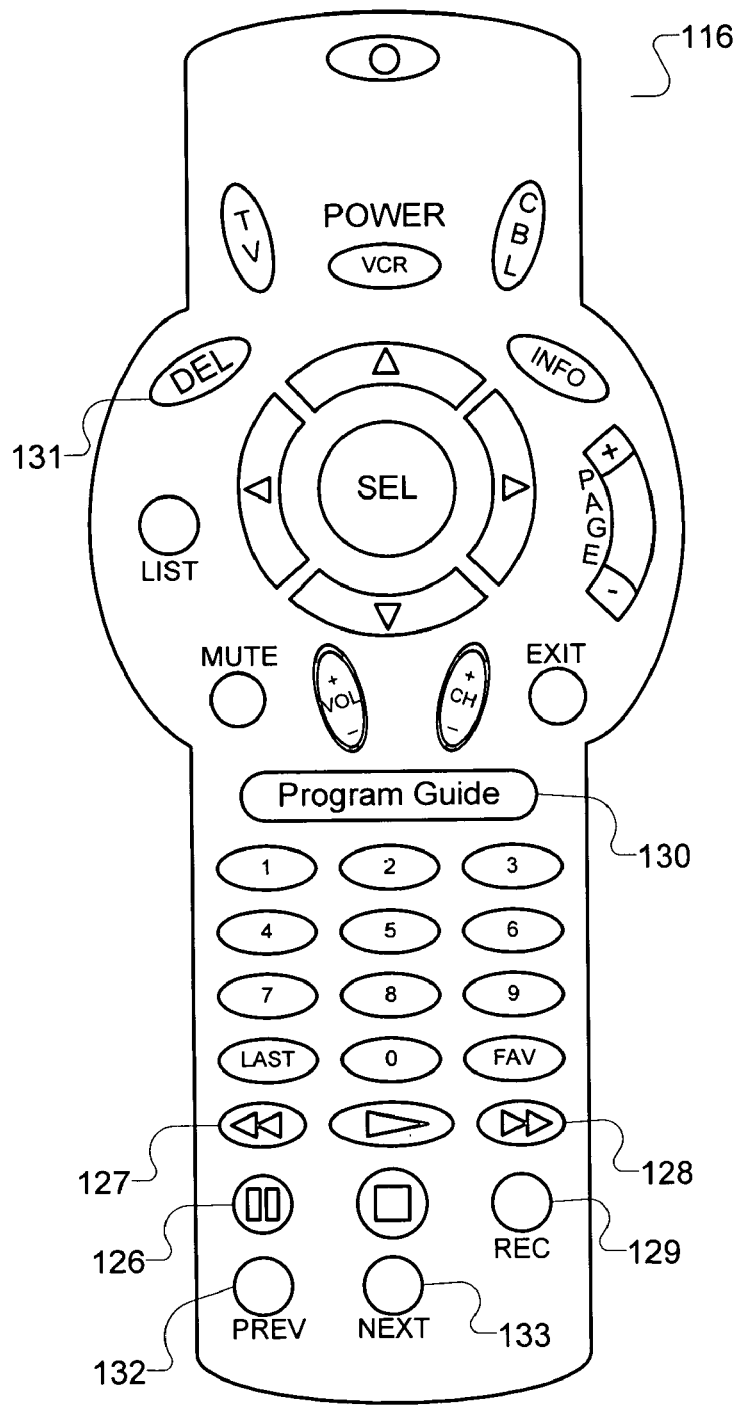
FIG. 2 illustrates an exemplary user input device according to one exemplary embodiment of the present invention.

An exemplary user input device (116) is shown in FIG. 2. The input device (116) may be a remote control, as shown in FIG. 2, or any other type of user input device such as a group of buttons (not shown) affixed to the STB (100), a touch screen input device (not shown) displayed on the display device (115), a keyboard device, or a voice activated device. The input device (116) may be configured to allow a user to control viewing options and trick play modes of the media content. For example, rewind (127) and fast-forward buttons (128) enable a user to access different frames within recorded media content instances in the permanent storage unit (119) or in the live cache buffer (110). A record button (129) may also be included which enables the user to designate as permanently recorded any media content instance buffered in the live cache buffer (110). A pause button (126) may enable the user to pause a media content instance, or pause during a search for a particular media content instance. A program guide button (130) may be configured to evoke the display of a program guide on the display device (115). Many alternative methods of providing user input may be used including a remote control device with different buttons and/or button layouts. The embodiments of the invention described herein are not limited by the type of device used to provide user input.

FIG. 3 illustrates an exemplary embodiment of the present invention wherein a recorded program list (135) may be displayed on the display device (115). The display device (115) of FIG. 3 is a television for illustrative purposes. The recorded program list (135) is a graphical user interface (GUI) that assists the user in navigating to, and between, media content instances or programs that have been permanently recorded. Any reference to recorded or stored media content instances in the following examples and in the appended claims, unless specifically denoted otherwise, refers to media content instances that are permanently stored in a permanent storage unit (119; FIG. 1).

In one embodiment, the recorded program list (135) displays a list of some or all of the media content instances that are permanently stored. For example, as shown in FIG. 3, a number of stored media content instances are listed in the recorded program list (135). The media content instances of FIG. 3 are all television programs for illustrative purposes only. The recorded program list (135) may also include other types of media content such as audio programs and Internet-related material.

As shown in FIG. 3, the recorded program list (135) may be configured to display program information corresponding to each of the recorded media content instances. As shown in FIG. 3, the program information displayed by the recorded program list (135) may include, but is not limited to, the title of the media content instances, the duration of the media content instances, and the date of recording of the media content instances. For example, the recorded program list (135) shows that an episode of Seinfeld (136) was recorded on Jun. 24, 2004 and that its duration is 30 minutes. Program information may also include, but is not limited to, genre information, ratings information, program start and stop times, program descriptions, and other pertinent program information text. According to one exemplary embodiment, the recorded program list (135) may include as much or as little program information as best serves a particular application.

The number of recorded media content instances or programs shown by the recorded program list (135) may be limited by a number of factors including the physical dimensions of the display device (115). In one embodiment (not shown), the recorded program list (135) may include scroll bars configured to allow a user to scroll through program information corresponding to various recorded media content instances that may or may not be currently displayed on the display device (135).

As shown in FIG. 3, a user often records multiple episodes of the same media content instance or program. For example, FIG. 3 shows that the multiple episodes of Seinfeld have been recorded. Although the exemplary recorded program list (135) shows that three episodes of Seinfeld have been recorded, it will be recognized that any number of episodes of the same media content instance may be recorded. A user often desires to view all of the recorded episodes of a particular media content instance during a single viewing session. Hence, according to one embodiment of the present invention and as will be explained below, the user may have the option to view a single episode or multiple episodes during a particular viewing session.

In one embodiment, as shown in FIG. 3, a user may select one of the recorded media content instances or programs for viewing. In other words, the user may select one of the recorded media content instances or programs to be displayed on the display device. For example, the user may select the media content instance Seinfeld (136) for viewing. The user may make the selection by highlighting a field in the recorded program list (135) containing the desired media content instance title or by some other known method.

Figure 4:
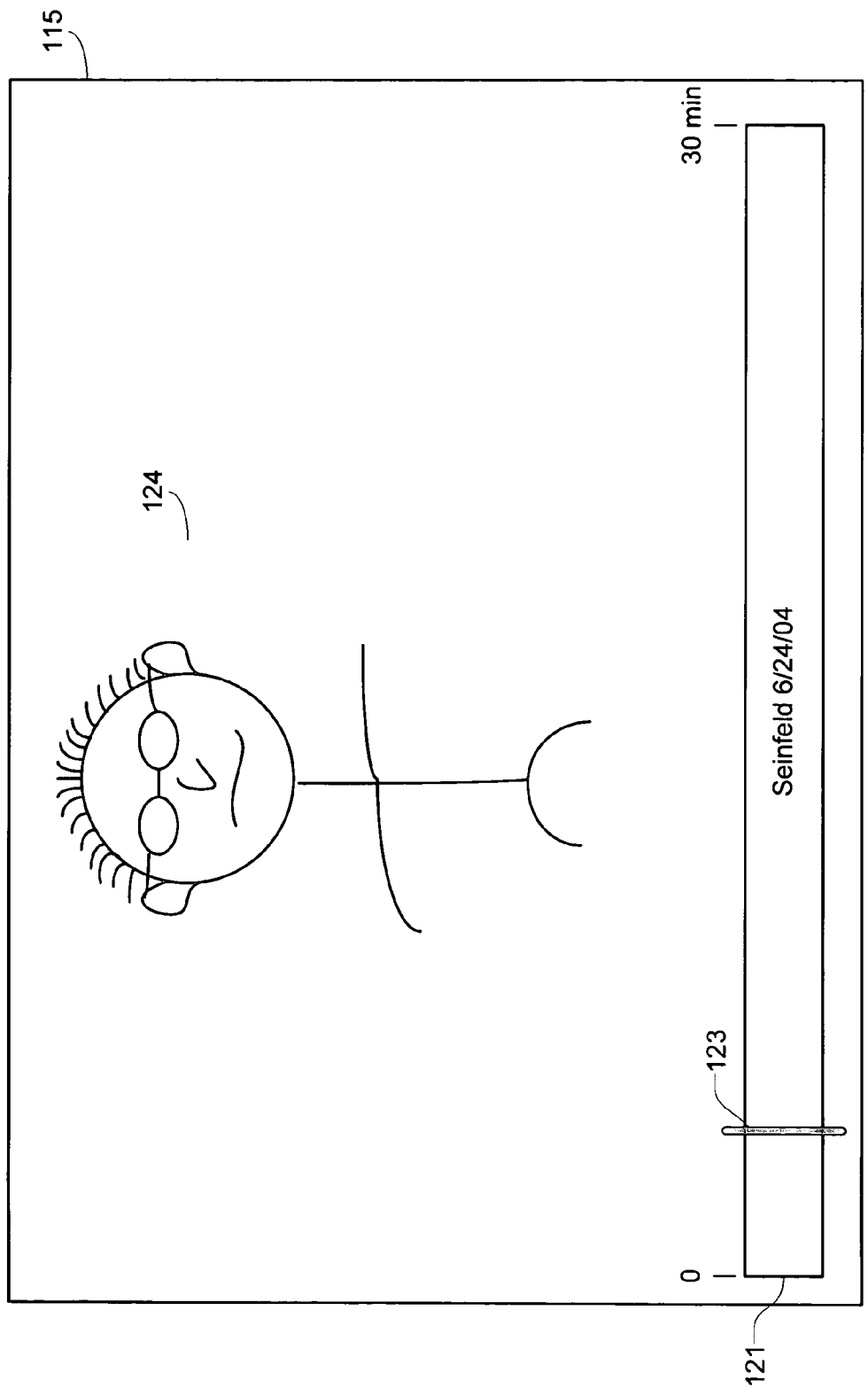
FIG. 4 illustrates a selected media content instance displayed on a display device according to one exemplary embodiment of the present invention.

After a media content instance is selected for viewing, the selected media content instance or program may be displayed on the display device (115). The selected media content instance is now the current media content instance or program. The terms "current media content instance," and "current program" will be used interchangeably herein and in the appended claims, unless otherwise specifically denoted, to refer to a media content instance that is currently being displayed on the display device (115). FIG. 4 illustrates an exemplary embodiment of the present invention wherein a selected media content instance (124) is displayed on a display device (115). The exemplary media content instance (124) of FIG. 4 is the current media content instance Seinfeld (136; FIG. 3) for illustrative purposes only.

As shown in FIG. 4, a progress bar (121) may also be displayed on the display device (115) according to an exemplary embodiment. The progress bar (121) is a GUI that assists the user in navigating within the current media content instance (124). In one embodiment, the progress bar (121) graphically illustrates to a user the total duration of the current media content instance (124). For example, the progress bar (121) shows that Seinfeld has a duration of 30 minutes. The progress bar may also illustrate a number of other informational facts about the episodes as will be described below. For example, the progress bar (121) may be configured to display the title of the current media content instance (124) as well as the recording date of the current media content instance (124), as shown in FIG. 4. Any amount of program information may be displayed with the progress bar (121) according to an exemplary embodiment. For example, the progress bar (121) may be configured to not display any program information.

The progress bar (121) may also graphically show progression through the recorded episodes as the viewer moves, or navigates, through the current media content instance (124). As shown in FIG. 4, the progress bar may include a progress indicator (123). The progress indicator (123) graphically indicates to the user a location of a frame that is currently being displayed on the display device (115). For example, in FIG. 4, the progress indicator (123) indicates that a frame located in the beginning portion of the Seinfeld episode recorded on Jun. 24, 2004 is being displayed.

The progress indicator (123) may be a vertical line, as shown in FIG. 4. In an alternative embodiment, the progress indicator (123) may be any shape, such as a triangle, and may be located above, below, or on top of the progress bar (121). In general, the progress indicator (123) may be any graphical symbol that allows the user to quickly identify the frame that is currently being displayed within the current media content instance.

In one embodiment, the user may view the media content instance (124) in any trick play mode such as, slow motion, fast motion, reverse play or rewind, fast forward play, instant replay, jumping, pausing of live broadcast, and scanning. The user may navigate the progress indicator (123) to any position within the progress bar (121) to view any frame of the media content instance (124).

As shown in FIG. 4, the progress bar (121) may be superimposed on top of the viewing portion of the display device (115) such that the viewer may simultaneously view the media content instance (124) and the progress bar (121). The progress bar (121) is preferably located in the bottom half of the viewing portion of the display device (115), as shown in FIG. 4, so as not to overly interfere with the current media content instance (124). However, in an alternative embodiment, the progress bar (121) may be located at any position on the viewing portion of the display device (115). Furthermore, the exact location of the progress bar (121) may be specified by the user.

Figure 5:
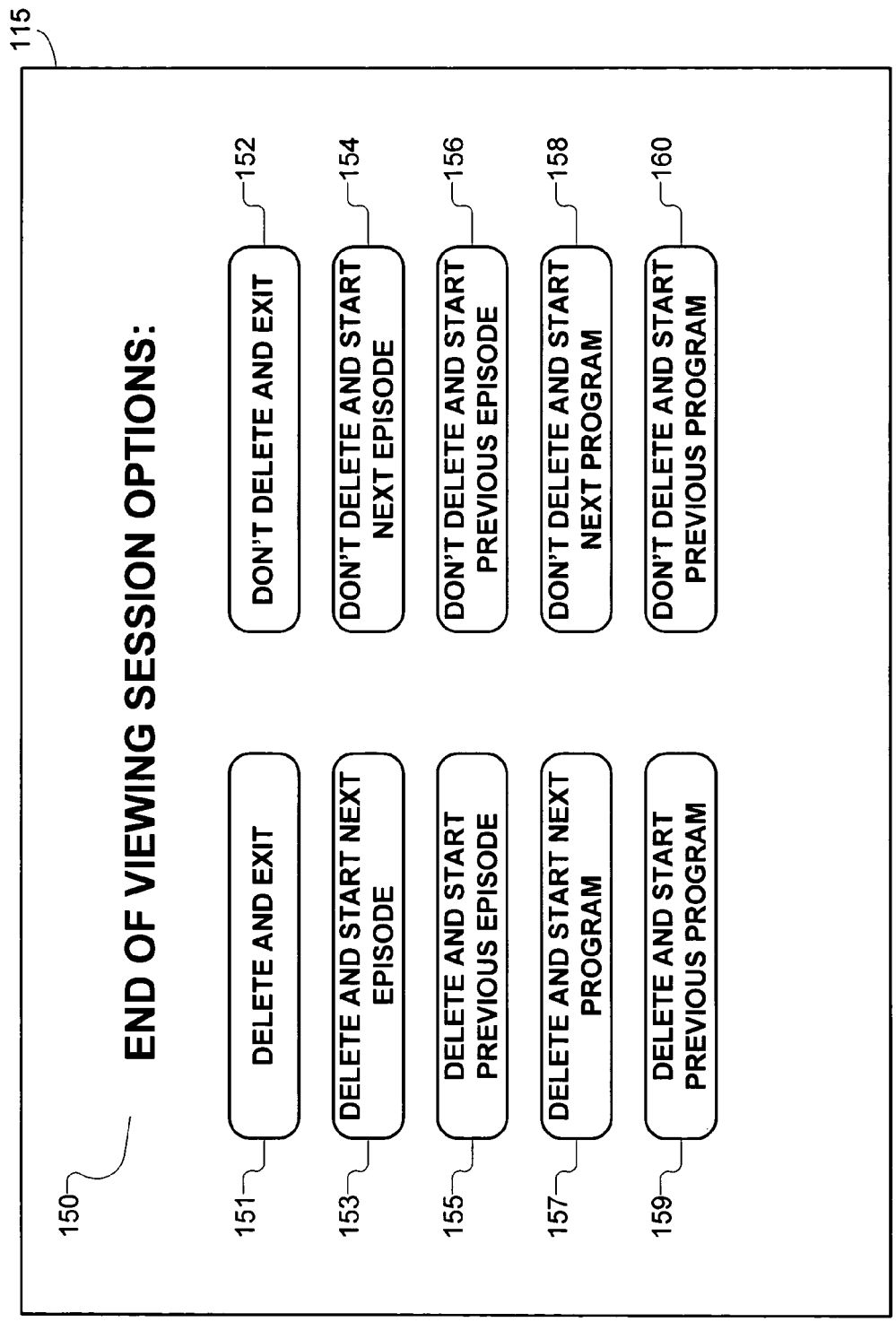
FIG. 5 illustrates a GUI configured to allow a user to delete or retain a current media content instance and then transition to a different media content instance that has been recorded in the permanent storage unit according to one exemplary embodiment of the present invention.

In one embodiment, when a user finishes viewing a current media content instance, a GUI configured to allow the user to transition to a different media content instance may be displayed on the display device (115). FIG. 5 illustrates a GUI (150) according to an exemplary embodiment of the present invention that is configured to allow a user to delete or retain (i.e. not delete from the permanent storage unit) the current media content instance and then transition to a different media content instance that has been recorded in the permanent storage unit (119; FIG. 1). According to one exemplary embodiment, the GUI (150) may be automatically displayed by the STB (100; FIG. 1) immediately following the display of the last frame of the current media content instance. In an alternative embodiment, the GUI (150) may be displayed at any time within the current viewing session upon being invoked by the user. The user may invoke the GUI (150) by pressing a button on the user input device (116; FIG. 2) or by some other method.

As shown in FIG. 5, the GUI (150) may include a number of selectable options. It will be recognized that the options included in the GUI (150) of FIG. 5 are merely illustrative of the many different options that may be included in the GUI (150). For example, the user may choose to delete the current media content instance and exit to the recorded program list (135; FIG. 3) or to some other screen (option 151). Alternatively, the user may choose to not delete the current media content instance and exit to the recorded program list (135; FIG. 3) or to some other screen (option 152).

Continuing in the present example, the user may alternatively choose to delete or retain the current media content instance and transition to a next episode (options 153 and 154, respectively). In either instance, the STB (100; FIG. 1) may be configured to search the recorded program list (135) in the forward direction in relation to the current media content instance according to recording date for a recorded episode having the same title as the current media content instance. If a next recorded episode exists, the next recorded episode may be displayed on the display device (115). For example, if the current media content instance is Seinfeld with a recording date of Jun. 24, 2004 (136; FIG. 3), the next recorded episode that may be displayed is the Seinfeld episode recorded on Jul. 1, 2004. However, if no next recorded episode exists, a GUI or pop-up message (not shown) may be displayed signaling to the user that no next recorded episode exists. The user may then close the pop-up message and return to the GUI (150) to select a different option.

The user may alternatively choose to delete or retain the current media content instance and transition to a previous episode (options 155 and 156, respectively). In either instance, the STB (100; FIG. 1) may search the recorded program list (135) in the reverse direction in relation to the current media content instance according to recording date for a previously recorded episode having the same title as the currently showing program. If a previously recorded episode exists, the previously recorded episode may be displayed on the display device (115). For example, if the current media content instance is Seinfeld with a recording date of Jun. 24, 2004 (136; FIG. 3), the previously recorded episode that may be displayed is the Seinfeld episode recorded on Jun. 17, 2004. However, if no previous recorded episode exists, a GUI or pop-up message (not shown) may be displayed signaling to the user that no previously recorded episode exists. The user may then close the pop-up message and return to the GUI (150) to select a different option.

The user may alternatively choose to delete or retain the current media content instance and transition to a next recorded media content instance or program (options 157 and 158, respectively). In either instance, the STB (100; FIG. 1) may be configured to search the recorded program list (135) in the forward direction in relation to the current media content instance according to recording date for a next recorded program. If a next recorded program exists, the next recorded program may be displayed on the display device (115). For example, if the current media content instance is Seinfeld with a recording date of Jun. 24, 2004 (136; FIG. 3), the next recorded program that may be displayed is The Simpsons with a recording date of Jun. 27, 2004. However, if no next recorded program exists, a GUI or pop-up message (not shown) may be displayed signaling to the user that no next recorded program exists. The user may then close the pop-up message and return to the GUI (150) to select a different option.

The user may alternatively choose to delete or retain the current media content instance and transition to a previously recorded program (options 159 and 160, respectively). In either instance, the STB (100; FIG. 1) may search the recorded program list (135) in the reverse direction in relation to the current media content instance according to recording date for a previously recorded program. If a previously recorded program exists, the previously recorded program may be displayed on the display device (115). For example, if the current media content instance is Seinfeld with a recording date of Jun. 24, 2004(136; FIG. 3), the previously recorded program that may be displayed is Wimbledon with a recording date of Jun. 23, 2004. However, if no previous recorded program exists, a GUI or pop-up message (not shown) may be displayed signaling to the user that no previously recorded program exists. The user may then close the pop-up message and return to the GUI (150) to select a different option.

Figure 6:
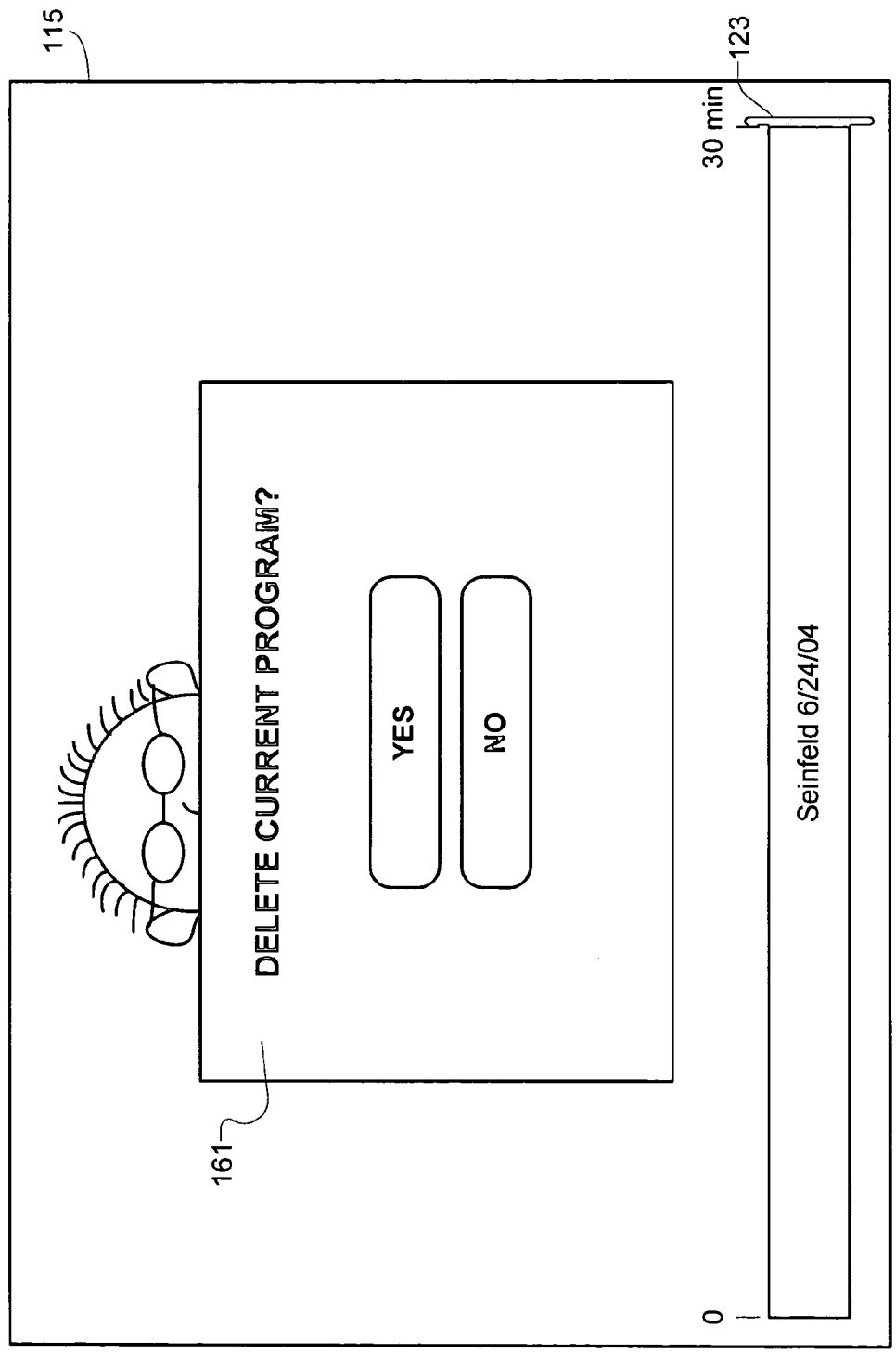
FIG. 6 illustrates a GUI configured to allow the user to delete or retain a current media content instance or program according to one exemplary embodiment of the present invention.
Figure 7:
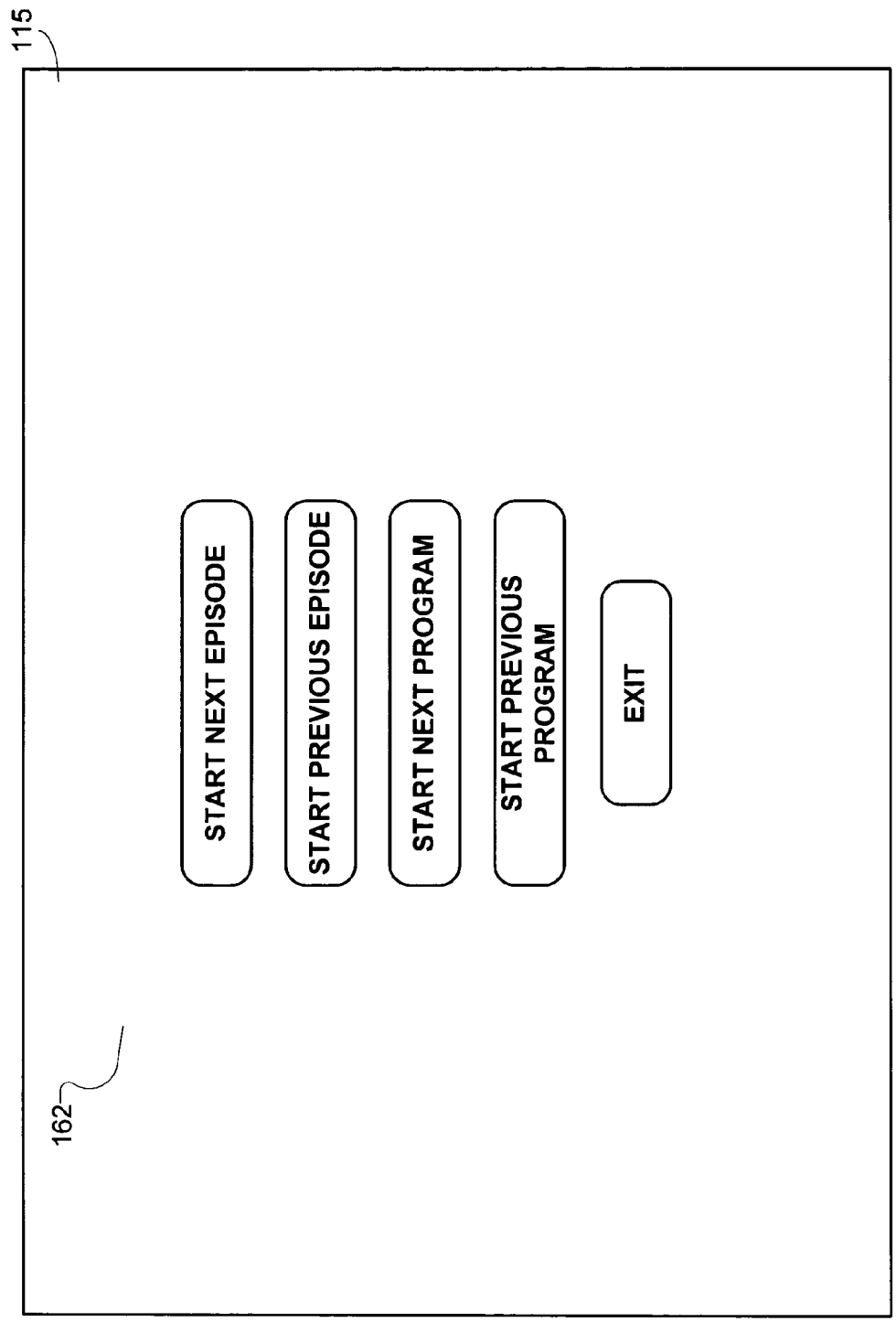
FIG. 7 illustrates a GUI configured to allow the user to transition to a previous or next episode or program according to one exemplary embodiment of the present invention.

In one embodiment, the options of FIG. 5 may be presented to the user using two or more successive GUIs, as shown in FIGS. 6 and 7. For example, as shown in FIG. 6, a first GUI (161) may be displayed when a user finishes viewing a current media content instance. The first GUI (161) may allow the user to delete or retain the current media content instance or program. FIG. 7 shows a second GUI (162) that may be displayed after the user has chosen to delete or retain the current media content instance or program. The GUI (162) of FIG. 7 may be configured to allow the user to transition to a previous or next episode or program as has already been described.

Figure 8:
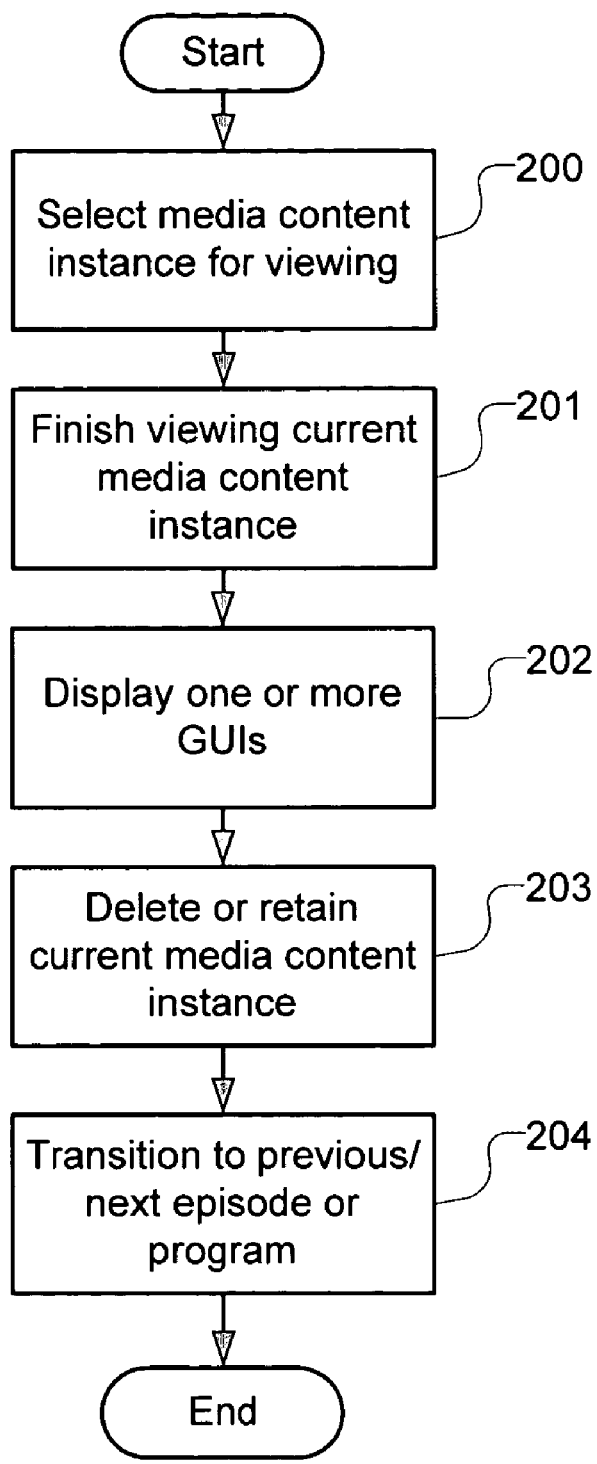
FIG. 8 is a flow chart illustrating an exemplary method of displaying one or more media content instances according to one exemplary embodiment of the present invention.

FIG. 8 is a flow chart illustrating an exemplary method of displaying one or more media content instances. As shown in FIG. 8, the user may first select a media content instance for viewing (step 200). The selection may be made from a recorded program list (135; FIG. 3), for example. Once selected, the media content instance may be displayed on the display device and may be referred to as the current media content instance. The user may then finish viewing the current media content instance (step 201). In one embodiment, the user may finish viewing the current media content instance by viewing the last frame of the current media content instance. Alternatively, the user may finish viewing the current media content instance by pressing a button on the user input device (116; FIG. 2) or by some other method. Once the user is finished viewing the current media content instance (step 201), one or more GUIs may be displayed (step 202). The GUIs may be configured to allow the user to then delete or retain the current media content instance (step 203) and then transition to a previous or next episode or program (step 204), as described in detail above.

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A method of operating a personal video recorder (PVR) system to manage recorded media content instances, said method comprising:
   recording broadcast television programming with said PVR;
   displaying a playback of a first recorded media content instance in said recorded television programming from a memory of said PVR; and
   terminating said display of said first recorded media content instance; and
   upon termination of said playback of said first recorded media content instance:
      searching a recorded television program list according to recording date for a recorded second media content instance in said recorded television programming having a same title as said first recorded media content instance;
      automatically prompting a user with a single graphical user interface (GUI) configured to delete or retain said first recorded media content instance in said memory of said PVR and immediately begin displaying said second recorded media content instance in said memory of said PVR;
   wherein a single selection in said GUI will both decide whether to delete or retain said first recorded media content instance, as well as start playback of said second recorded media content instance, and wherein said decision is the deletion of said first recorded media content instance; and
   wherein said GUI allows said user to specify whether said second recorded media content instance to be played back is to be another episode of a same television program as said first recorded media content instance.

2. The method of claim 1, further comprising:
   displaying a recorded program list graphical user interface (GUI), said recorded program list GUI listing a number of recorded media content instances;
   selecting said first recorded media content instance from said recorded program list GUI to be displayed on a display device.

3. The method of claim 1, wherein said second recorded media content instance has a date of recording prior in time to a date of recording corresponding to said first recorded media content instance.

4. The method of claim 1, wherein said first recorded media content instance has a date of recording prior in time to a date of recording corresponding to said second recorded media content instance.

5. The method of claim 1, wherein said second recorded media content instance is a next recorded episode of said television program or a previously recorded episode of said television program.

6. The method of claim 1, wherein said step of terminating said display of said first recorded media content instance comprises displaying a last frame of said first media content instance.

7. The method of claim 1, wherein said step of terminating said display of said first recorded media content instance comprises sending an input command from a user input device, said input command causing said GUI to be displayed.

8. The method of claim 1, further comprising displaying a progress bar during said display of said first recorded media content instance, said progress bar graphically representing the duration of said first recorded media content instance.

9. The method of claim 1, further comprising displaying a progress bar during said display of said second recorded media content instance, said progress bar graphically representing the duration of said second recorded media content instance.

10. A personal video recorder (PVR) system, said system comprising:
   a recording device configured to record broadcast television programming as a plurality of recorded media content instances;
   a storage device for storing said recorded media content instances;
   an output device configured to display a playback of a first recorded media content instance on a display device;
   a graphics engine configured to render graphics that are displayed on said display device;
   and a processor configured to control said graphics engine and said output device;
   wherein, upon termination of said playback of said first recorded media content instance, said processor is configured to automatically:

search a recorded television program list according to recording date for a recorded second media content instance in said storage device having a same title as the first recorded media content instance; and cause said graphics engine to display a single graphical user interface (GUI) to a user of said PVR following display of said first recorded media content instance, said GUI being configured to delete or retain said first media content instance in said storage device and immediately begin displaying said second recorded media content instance in said storage device;

wherein a single selection in said GUI will both decide whether to delete or retain said first recorded media content instance, as well as start playback of said second recorded media content instance, and wherein said decision is the deletion of said first recorded media content instance; and wherein said GUI allows said user to specify whether said second recorded media content instance to be played back is to be another episode of a same television program as said first recorded media content instance.

11. The system of claim 10, wherein said processor is further configured to cause said graphics engine to display a recorded program list graphical user interface (GUI), said recorded program list GUI listing a number of recorded media content instances;

wherein said first recorded media content instance is selected from said recorded program list GUI to be displayed on a display device.

12. The system of claim 10, wherein said second recorded media content instance has a date of recording prior in time to a date of recording corresponding to said first recorded media content instance.

13. The system of claim 10, wherein said first recorded media content instance has a date of recording prior in time to a date of recording corresponding to said second recorded media content instance.

14. The system of claim 10, wherein said second recorded media content instance is a next recorded episode or a previously recorded episode of said television program.

\* \* \* \* \*